United States Patent [19]

Hayashida

[11] Patent Number: 4,477,122

[45] Date of Patent: Oct. 16, 1984

[54] HYDRAULIC PRESSURE CONTROL VALVE FOR AUTOMOBILE BRAKING SYSTEM

[75] Inventor: Yoshihiro Hayashida, Kanagawa, Japan

[73] Assignee: Tokico Ltd., Japan

[21] Appl. No.: 476,393

[22] Filed: Mar. 17, 1983

[30] Foreign Application Priority Data

Mar. 19, 1982 [JP] Japan ............................ 57-39192[U]

[51] Int. Cl.³ .............................................. B60T 8/26
[52] U.S. Cl. .................................... 303/6 C; 188/349
[58] Field of Search .............. 303/6 C, 6 R; 188/349, 188/345, 151 A; 60/591

[56] References Cited

U.S. PATENT DOCUMENTS

| | | | |
|---|---|---|---|
| 3,790,221 | 2/1974 | Fulmer | 303/6 C |
| 3,970,347 | 7/1976 | Mizusawa | 303/6 C |
| 4,049,323 | 9/1977 | Hess | 303/6 C |
| 4,252,379 | 2/1981 | Falk | 188/349 X |

FOREIGN PATENT DOCUMENTS

| | | | |
|---|---|---|---|
| 123666 | 9/1979 | Japan | 303/6 C |
| 31674 | 3/1980 | Japan | 303/6 C |
| 2052659 | 1/1981 | United Kingdom . | |

*Primary Examiner*—Douglas C. Butler
*Attorney, Agent, or Firm*—Wolf, Greenfield & Sacks

[57] ABSTRACT

A hydraulic pressure control valve for use in a dual circuit braking system of an automotive vehicle, and including a plunger slidably received in an elongated bore in a housing with opposite ends thereof being exposed to respective pressure circuits, and two pressure proportioning valve mechanisms being mounted on the housing with the axii thereof being perpendicular to the plunger, each valve mechanism including a stepped piston, an axial passage extending through the piston, a valve seat defined on one end of the passage, and a valve member cooperating with the valve seat. The plunger has on opposite end portions large and small diameter portions interconnected by an inclined surface portions, and a control member is interposed between the plunger and each valve member of the valve mechanism with one end abutting normally with the large diameter portion of the plunger and the other end being connected to the valve member such that when the control member abuts with the small diameter portion of the plunger in response to the axial displacement thereof the control member carries the valve member in the direction separating from the piston thereby preventing pressure proportioning function of the valve mechanism.

4 Claims, 2 Drawing Figures

HYDRAULIC PRESSURE CONTROL VALVE FOR AUTOMOBILE BRAKING SYSTEM

BACKGROUND OF THE INVENTION

This invention relates to a hydraulic pressure control valve for use in a hydraulic braking system of such as an automotive vehicle and, particularly to so-called brake pressure proportioning valve wherein brake pressure delivered to rear wheel brakes is reduced as compared with brake pressure delivered to front wheel brakes when the pressure exceeds a predetermined level thereby preventing skidding phenomenon of the rear wheels.

Particularly, the hydraulic braking system to which present invention concerns is of the type including a dual type or tandem type master cylinder associated with first and second mutually independent hydraulic lines extending from respective outlet ports of the master cylinder, and respective hydraulic lines are connected to left and right rear wheels respectively and to right and left front wheels respectively or to both front wheels when two independent brake cylinders are provided on each front wheel.

Typically, the pressure proportioning valve mechanism includes a differential pressure piston working in a bore and having different effective pressure receiving areas on opposite ends thereof, an axial passage provided in the piston, and a valve member cooperating with one end of the passage. A chamber facing a small end or an end having a small effective pressure receiving area (inlet chamber) is connected to the outlet port of the master cylinder, and a chamber facing a large end or an end having a large effective pressure receiving area (outlet chamber) is connected to rear wheel. When the pressure supplied to the valve mechanism exceeds a predetermined level, the piston moves toward the small end and the valve member cuts off the communication between two chambers (a cut-off pressure). And when the pressure in the inlet chamber further increases, the piston moves toward the outlet chamber to permit a small amount of liquid flow from the inlet chamber to the outlet chamber and returns to valve closing position. Whereby the pressure in the outlet chamber increases at a reduced rate as compared with the pressure in the inlet chamber.

U.S. Pat. No. 3,970,347 discloses a brake pressure control valve for use with a dual type brake master cylinder and connected to two independent pressure circuits. The valve comprises an elongated housing having an axial bore therein, and two pressure proportioning valve mechanisms are provided in the opposite end portions of the bore in mutually aligned relationship. The valve further includes a failure warning mechanism including a balance piston arranged between the two differential pistons of the pressure proportioning mechanisms and being displaceable to actuate an electric switch when a failure such as a fluid leakage exists in one of pressure circuits.

UK patent application GB No. 2052659A discloses two brake pressure proportioning valve mechanisms mounted on a housing of a tandem type brake master cylinder with the axis of each valve mechanism being perpendicular to the axis of the master cylinder. The detailed construction of the proportioning valve mechanism of the latter particularly with respect to the differential pressure piston and the valve member cooperating with the piston differs substantially from that of U.S. Pat. No. 3,970,347, however, both valve mechanisms operate similarly.

However, these prior art devices have a shortcoming such that even when there exists a failure such as a liquid leakage in either one of pressure circuits the pressure proportioning valve mechanism in the other pressure circuit controls the brake pressure applied to rear wheel similarly to the normal operating condition whereby the braking force acting on the vehicle is reduced about one half and, accordingly, it is required to apply an excessibly large brake applying force on a brake pedal for safely stopping the vehicle.

SUMMARY OF THE INVENTION

The present invention aims to prevent aforesaid shortcoming and provides a hydraulic pressure control valve comprising a housing having an axially extending bore therein with the opposite end portions of the bore being communicated with respective brake pressure circuits, a plunger slidably received in the bore and having on opposite end portions tapered surface portions which are formed between large diameter portions and reduced diameter distal end portions, and a pair of pressure proportioning valve mechanisms with the axii thereof being perpendicular to the axis of the bore in the housing. Each pressure proportioning valve mechanism comprises a stepped piston having an axial passage therethrough, large and small diameter bore portions for receiving the stepped piston, a valve closure member cooperating with one end of the axial passage in the stepped piston, and a control member disposed between the valve closure member and the plunger with one end thereof normally abutting with the large diameter portion adjacent to the tapered surface portion, and the other end being connected to the valve closure member of the pressure proportioning valve mechanism. The large diameter bore portion is connected to such as a rear wheel brake.

BRIEF DESCRIPTION OF THE DRAWINGS

The invention will hereinafter be explained in detail with reference to accompanying drawings exemplifying a preferred embodiment of the invention, in which.

DESCRIPTION OF THE PREFERRED EMBODIMENT

Figure 1:
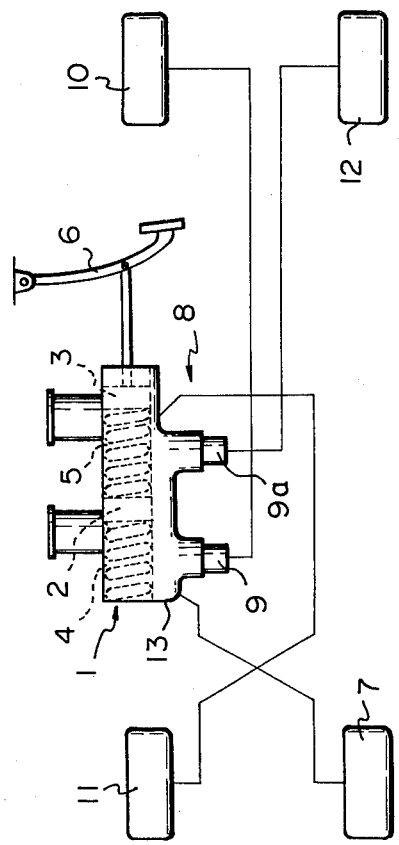
FIG. 1 is an explanatory view of a vehicle hydraulic brake system incorporating a hydraulic pressure control valve according to the invention.

In FIG. 1, a tandem master cylinder 1 has two pistons 2 and 3 for pressurizing fluid in respective pressure chambers 4 and 5. In depressing a brake pedal 6, the fluid under pressure in the chamber 4 is supplied directly to a brake cylinder of a left side front wheel 7 and, through a control valve mechanism or a pressure proportioning valve mechanism 9 of a brake pressure control valve 8 to a brake cylinder of a right side rear wheel 10. The fluid under pressure in the chamber 5 is supplied directly to a brake cylinder of a right side front wheel 11, and through another brake pressure control mechanism 9a of the pressure control valve 8 to a brake cylinder of a left side rear wheel 12.

Figure 2:
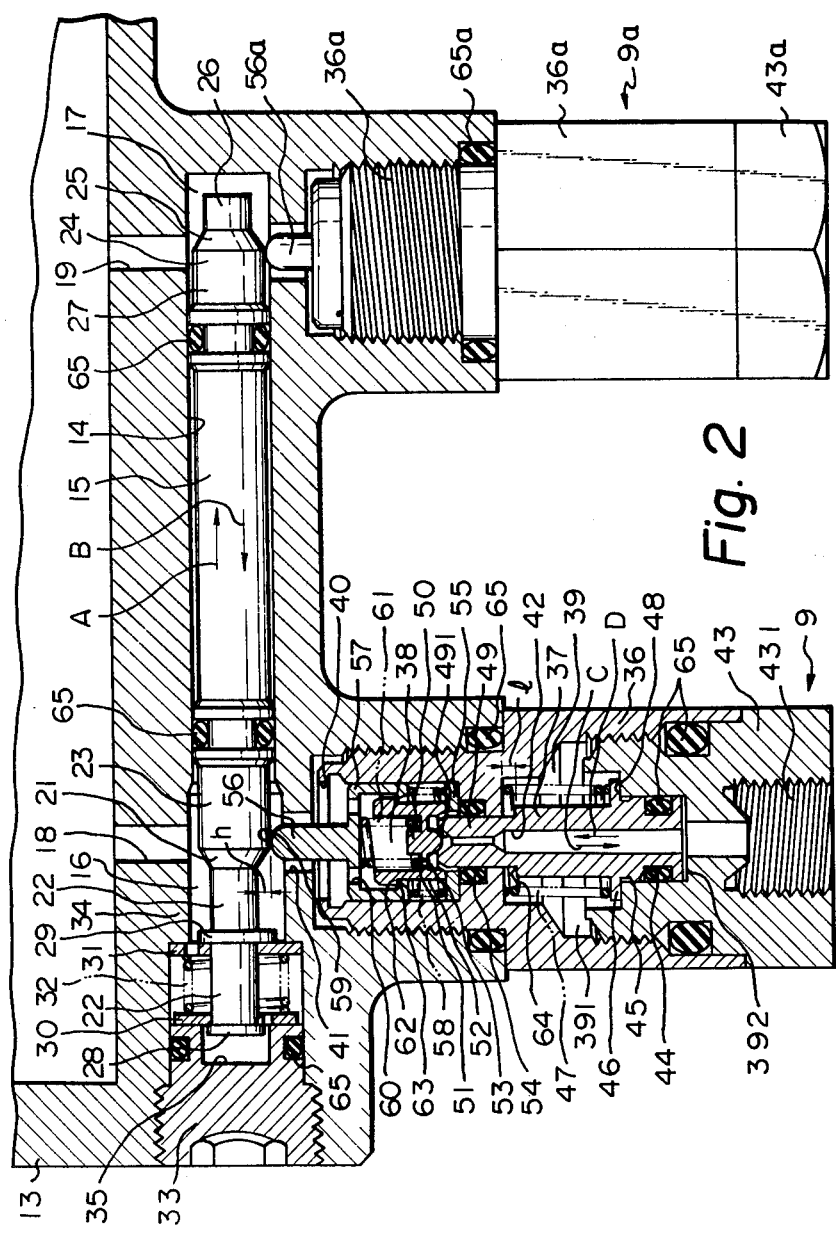
FIG. 2 is a longitudinal sectional view of the hydraulic pressure control valve of FIG. 1.

The master cylinder 1 comprises a housing 13 having, as shown in FIG. 2, on the bottom portion a longitudinal bore 14. A plunger 15 is received in the bore 14 and is slidable in the direction of the axis of the bore or in arrows A and B directions, and sealingly defines two chambers 16 and 17 in the opposite end portions of the bore 14. The chamber 16 is communicated with the pressure chamber 4 through an opening 18, and the chamber 17 with the pressure chamber 5 through an opening 19. There is provided on one end portion of the plunger 15 extending into the chamber 16 a tapered portion 21 which is defined between a small diameter end portion 22 and a large diameter inner portion 23 and, similarly, on the other end portion or the right end portion as viewed in FIG. 2 of the plunger 15 extending in the chamber 17 a tapered portion 25 which is defined between a small diameter end portion 26 and a large diameter inner portion 27. The plunger 15 acts as a balanced piston and for biasing the plunger 15 at neutral position. There is provided a balancing spring mechanism which is constituted, in the embodiment, of two annular flanges 28 and 29 provided on the small diameter portion 22, two annular retainers 30 and 31 provided between flanges 28 and 29 and a spring 32 extending between the retainers 30 and 31. Normally, the retainer 30 abuts with the flange 28 and with the inner end of a plug 33 which closes the left end of the bore 14, and the retainer 31 abuts with the flange 29 and an annular shoulder which is formed in the bore 14 and facing the plug 33. A recess 35 is formed in the plug 33 so as to permit the leftward movement of the plunger 15 as viewed in FIG. 2. In the embodiment, the retainers 30 and 31 are so-called split type consisting of two semicircular pieces but, alternatively, the flange 28 is removably mounted on the plunger by such as screw-threads. When the plunger 15 is displaced from the neutral position shown in the drawing the spring 32 acts to return the plunger 15 to the neutral position.

The pressure proportioning valve mechanisms 9 and 9a are similar and, therefore, the description will hereinafter be made mainly with respect to the valve mechanism 9 and, with respect to the valve mechanism 9a, corresponding parts are referred with the same reference numerals having a suffix a.

The valve mechanism 9 comprises a housing 36 screw-threadingly secured to the housing 13, and a stepped piston 37 acting as a differential pressure piston received in the housing 36 and being slidable in the direction of the axis of the valve mechanism 9 which is perpendicular to the axis of the bore 14 or in arrows C and D directions. The piston 37 divides the interior of the housing 36 into two chambers 38 and 39, and the chamber 38 is communicated permanently with the chamber 16 in the housing 13 through an opening 40 in the housing 36 and an opening 41 in the housing 13. A longitudinal hole 42 is formed through the piston 37 to constitute a fluid passage therethrough. The chamber 39 is closed by a cap 43 which is screw-threadingly secured to the housing 36. A large diameter portion 45 of the piston 37 is slidably received in a bore 44 in the cap 43, thus, the chamber 39 is divided into an air chamber 391 and a fluid chamber 392 which is defined in the bore 44 and facing the end surface of the large diameter portion 45 of the piston 37. An annular flange 46 is formed on the large diameter portion 45 of the piston 37, and a coil spring 47 extends between the annular flange 46 and an annular shoulder on the housing 36 to bias the piston 37 in the arrow C direction so that the annular flange 46 of the piston 37 normally abuts with an annular shoulder 48 on the cap 43. A valve seat 491 is formed on end surface of a small diameter portion 49 of the stepped piston 37 and on the upper end of the hole 42. The valve seat 491 cooperates with a valve portion 50 which is integrally formed with a cylindrical portion 51 to constitute a valve member 52. There is provided a plurality of openings 53 in a flange portion of the valve member 52 which connects integrally the valve portion 50 and the cylindrical portion 51. The valve member 52 is biased toward the valve seat 491 by a coil spring 61 and, normally, the valve portion 50 is spaced from the valve seat 491.

A control member 56 is fitted in the housing 36 to slide in arrows C and D directions. The control member 56 comprises a cylindrical portion 57 slidingly engaging with the housing 36, and a projecting portion 59, and the distal end of the projecting portion 59 normally abuts with the large diameter portion 23 of the plunger 15 at the position adjacent to the tapered surface portion 21. The coil spring 61 is interposed between the valve member 52 and the control member 56 to bias the valve member 52 toward the valve seat 491 or in arrow C direction and to bias the control member 56 toward the plunger 15 or in arrow D direction. A coil spring 58 is interposed between the lower end of the control member 56 and an annular retainer 55 which acts to retain a seal ring 54. The seal ring 54 seals a small diameter bore portion of the housing 36 which slidably receives the small diameter portion 49 of the piston 37. A plurality of openings 60 are provided in the control member 56. Normally, the cylindrical portion 51 of the valve member 52 abuts with the annular retainer 55. Further, there are provided a projection 62 on the outer surface of the cylindrical portion 51 of the valve member 52 and a projection 63 is formed on the inner surface of the cylindrical portion 57 of the control member 56 to cooperate with the projection 62 such that when the control member 56 moves in arrow D direction the valve member 52 is carried by the control member 56 to move in arrow D direction. In the inactuated condition of the valve mechanism 9 as showing in FIG. 2, there is provided a distance l between an annular shoulder 64 on a diametrical step between the small and large diameter portions 49 and 45 of the piston 37 and the housing 36 for restricting the upward movement of the piston 37, and the distance l is smaller than the radial difference h between the large and small diameter portions 23 and 22 of the plunger 15. Shown at 65 in FIG. 2 are seal rings.

In normal operating condition, the pressure generated in pressure chambers 4 and 5 in the master cylinder 1 by depressing the brake pedal 6 are equal, thus, the pressure in the chamber 16 is equal to the pressure in the chamber 17 and the plunger 15 maintains the balanced or neutral position, with the control members 56 and 56a abutting respectively with large diameter portions 23 and 27 of the plunger 15. The fluid under pressure in the chamber 16 is supplied to the brake cylinder of the right rear wheel 10 through the opening 41, the chamber 38, the openings 60 in the control member 56, the openings 53 in the valve member 52, a clearance between the valve portion 50 of the valve member 52 and the valve seat 491 on the stepped piston 37, the hole 42 in the piston 37, the fluid chamber 392 in the cap 43 and a pipe line (not shown) connected to female screw-thread portion 391 in the cap 43.

When the pressure in the chamber 16 increases by further depressing the brake pedal 6, the piston 37 gradually moves in arrow D direction due to the difference in pressure receiving area of the large and small diameter portions 45 and 49 of the piston 37 and against the spring force of the spring 47. At a predetermined pressure, the valve seat 491 on the piston 37 engages with the valve portion 50 of the valve member 52 to cut off the supply of pressure to the brake cylinder of the rear wheel 10. Thereafter, the pressure supplied to the rear wheel 10 increases at a reduced rate as compared with the increase in the pressure in the chamber 16 or the pressure supplied to the front wheel 7 with the valve seat 491 repeatingly contacting with and separating from the valve portion 50 of the valve member 52. Thus, the skidding phenomenon on the rear wheel 10 can effectively be prevented. In releasing the brakes the pressure in the pressure chamber 4 is firstly released, and the pressure in the chamber 38 decreases. The pressure in the chamber 392 acts on the valve portion 50 and displaces upward the valve member 52 against the spring force of the spring 61 thereby decreasing the pressure supplied to the rear wheel 10. Finally, the spring 47 overcomes the pressure in the chamber 392 to displace downward the piston 37. The proportioning valve mechanism 9a operates similarly and controls the pressure supplied to the brake cylinder of the left rear wheel 12.

When there exists a failure such as fluid leakage in, for example, the pressure circuit connected to wheels 11 and 12, and the pressure in the chamber 17 cannot effectively be raised even when the master cylinder 1 is actuated, the plunger 15 moves in arrow A direction against the force of the spring 32 due to differential pressure between the chambers 16 and 17. The projecting portion 59 of the control member contacts with the small diameter portion 22 of the plunger 15 due to the movement of the plunger 15. The control member 56 moves in arrow D direction due to the force of the spring 58 by the distance h. The piston 37 can not displace in arrow D direction exceeding the distance l and, since the distance l is smaller than the distance h the valve seat 491 on the piston 37 can not contact with the valve portion 50 of the valve member 52 the communication between the chamber 38 and the chamber 392 through the hole 42 is permanently maintained even though the pressure in the chamber 38 exceeds sufficiently. The pressure supplied to the rear wheel 10 is equal to the pressure supplied to the front wheel 7. As the result, the braking force on the rear wheel 10 can be increased as compared with the normal operating condition, thus, it is possible to compensate the decrease in the braking force caused of the failure in one pressure circuit at some extent.

When a failure exists in the pressure circuit connected to the pressure chamber 4 and the wheels 7 and 10, the plunger 15 displaces in arrow B direction in applying the brakes and, the pressure proportioning valve mechanism 9a operates similarly not to cut off the pressure supplied to the brake cylinder of the rear wheel 12.

In the embodiment, the stepped piston 37 having small and large diameter portions 49 and 45 constitutes the differential pressure piston according to the invention, however, the invention is not limited to the specified configuration of the differential pressure piston. Further, the large diameter portions 23 and 27, the small diameter portions 22 and 26 and tapered portions 21 and 25 are formed on the plunger 15 to displace the control members 56 and 56a in the direction of the radius of the plunger 15 in response to the axial displacement of the plunger 15 in the embodiment, but, such constitution may be substituted by annular grooves formed in large diameter portion of the plunger with the bottom of each groove defining the small diameter portion which is connected to the large diameter portion through a smooth curved surface portion. Further, in the embodiment, the valve member 52 engages with the control member 56 through projections 62 and 63, but such projections may be substituted by two or more angularly spaced and axially extending slots formed in either of the two members 52 and 56 and pins secured to the other of the two members and received slidably in respective slots.

As described heretofore, according to the invention, the valve member of the pressure proportioning valve mechanism is forcibly moved in the direction separating from corresponding valve seat defined on the differential pressure piston in response to the axial displacement of the balanced pressure plunger when a failure exists in either one of pressure circuits, thus, it is possible to sufficiently increase the pressure of fluid supplied to the rear wheel. The safety of the vehicle can be assured, and the force applied on the brake pedal can effectively be utilized.

What is claimed is:

1. A hydraulic pressure control valve for use in a hydraulic braking system having two independent pressure circuits in an automotive vehicle, said valve comprising a housing having an axially extending bore with the opposite end portions thereof being communicated with respective pressure circuits, a plunger slidably received in the bore and having on opposite end portions inclined surface portions formed between large diameter portions and small diameter portions respectively, and two pressure proportioning valve mechanisms communicated respectively with opposite end portions of said bore, each of said valve mechanisms being mounted on the housing with the axis thereof being perpendicular to the axis of the bore, each valve mechanism including a differential pressure piston, an axial passage formed in the piston with the end of the passage nearer the end portion of said bore being formed to define a valve seat and the other end of said passage remote from said end portion of the bore being adapted to be connected to a brake cylinder of a rear wheel of said vehicle, a valve member cooperating with said valve seat in response to the displacement of said piston, and a control member disposed between the valve member and the plunger, said control member abutting normally with the large diameter portion thereof and being connected to said valve member such that when the control member abuts with the small diameter portion of said plunger in response to the axial displacement thereof said control member carries the valve member in the direction separating from the piston thereby preventing pressure proportioning function of said valve mechanism.

2. A pressure control valve according to claim 1 wherein the differential pressure piston is a stepped piston having small and large diameter portions.

3. A pressure control valve according to claim 1 wherein the control member is biased toward the plunger by a spring.

4. A pressure control valve according to claim 3 wherein the control member is axially displaceable relative to the valve member by a limited amount, and a spring is interposed between the two members for biasing the two members in the direction separating from one another.

* * * * *